Figure 1:
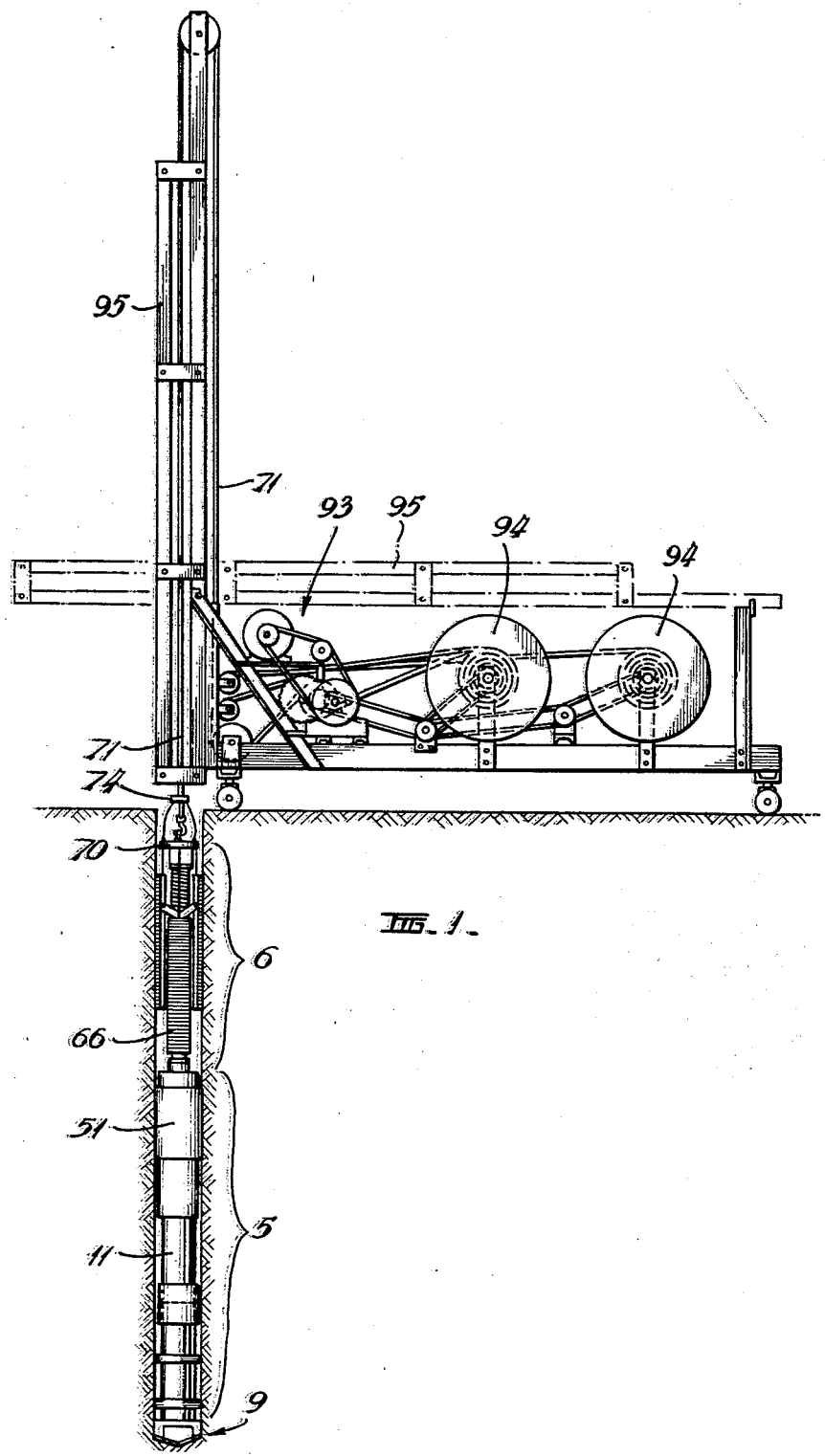

May 25, 1965  W. C. GINIES  3,185,225
FEEDING APPARATUS FOR DOWN HOLE DRILLING DEVICE
Filed May 2, 1963  14 Sheets-Sheet 1

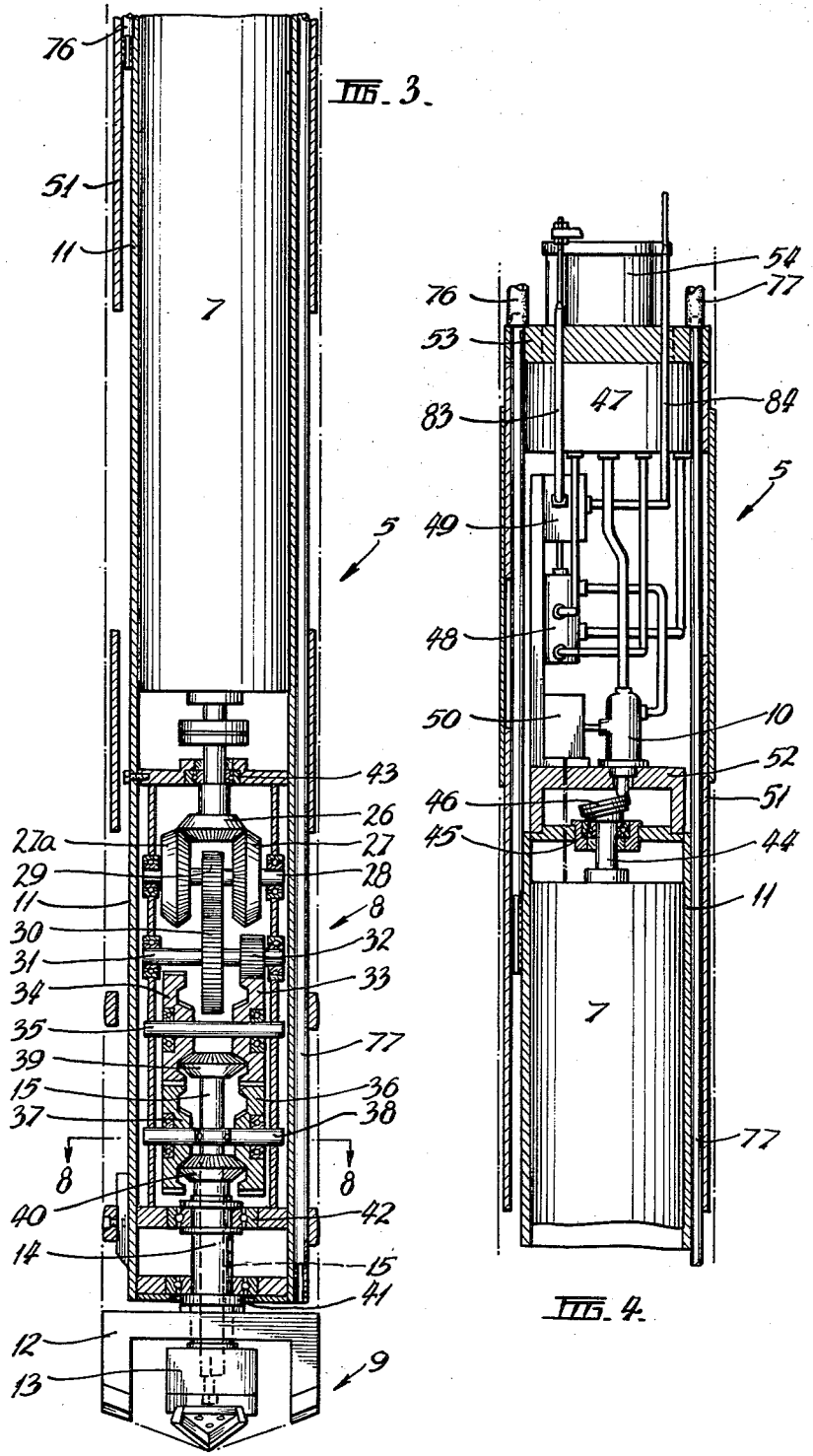

May 25, 1965   W. C. GINIES   3,185,225
FEEDING APPARATUS FOR DOWN HOLE DRILLING DEVICE
Filed May 2, 1963   14 Sheets-Sheet 4

May 25, 1965 W. C. GINIES 3,185,225
FEEDING APPARATUS FOR DOWN HOLE DRILLING DEVICE
Filed May 2, 1963 14 Sheets-Sheet 5
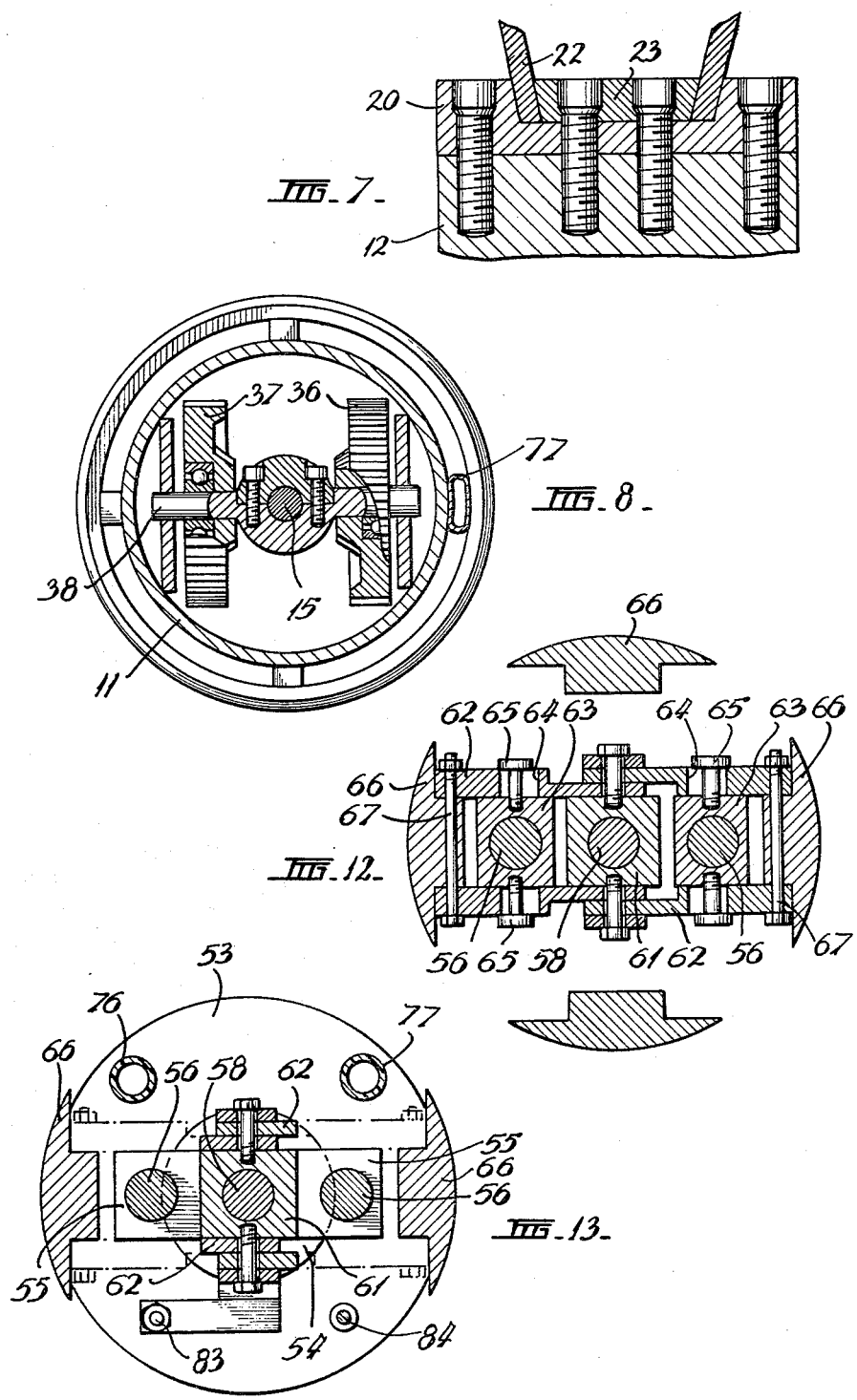

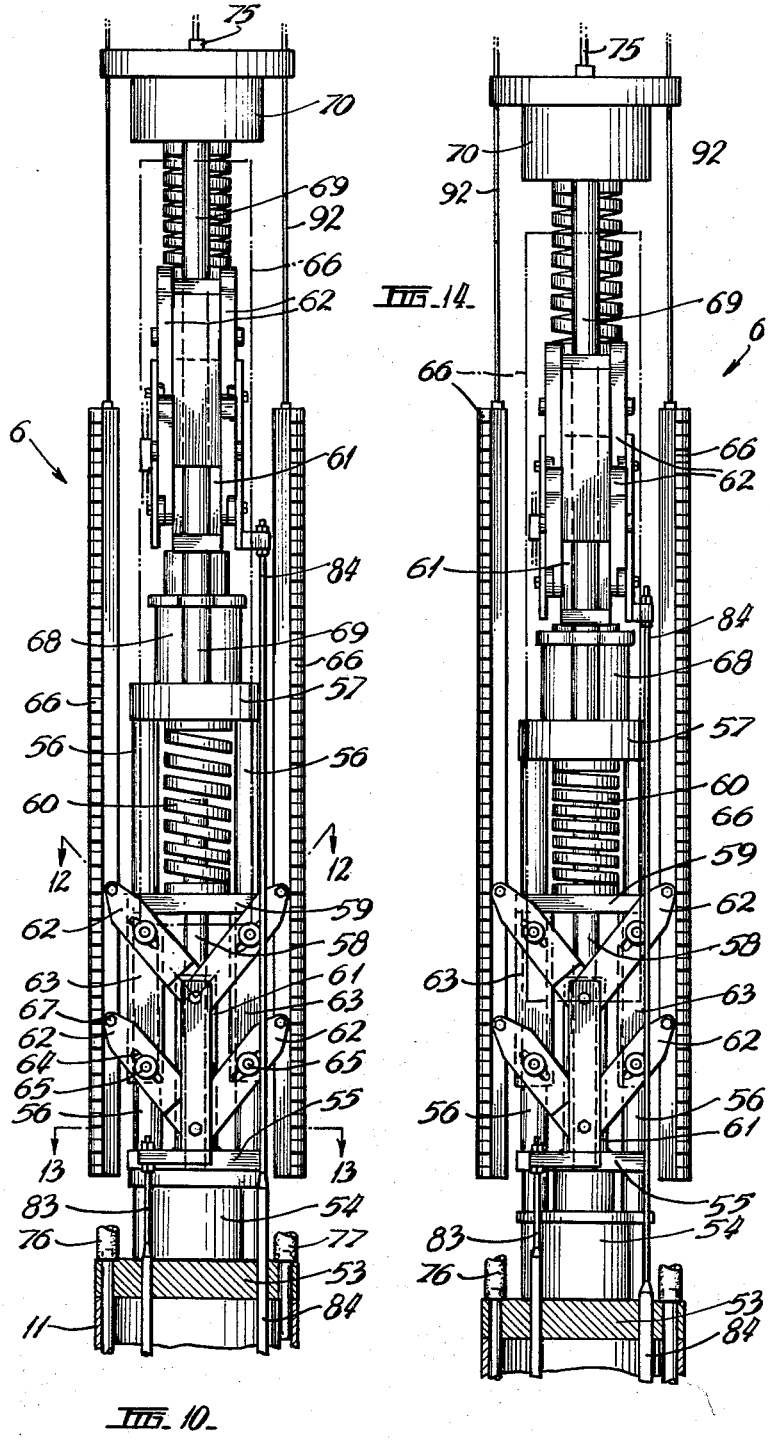

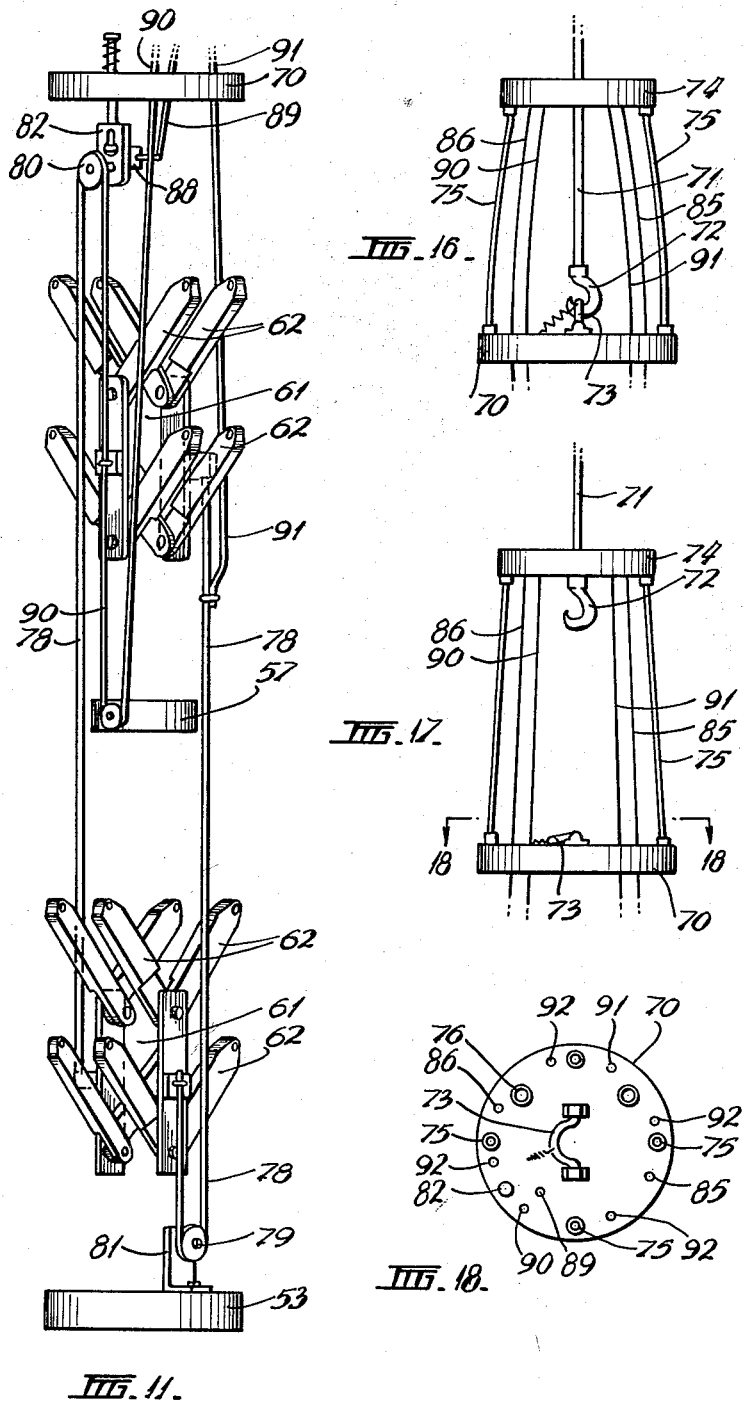

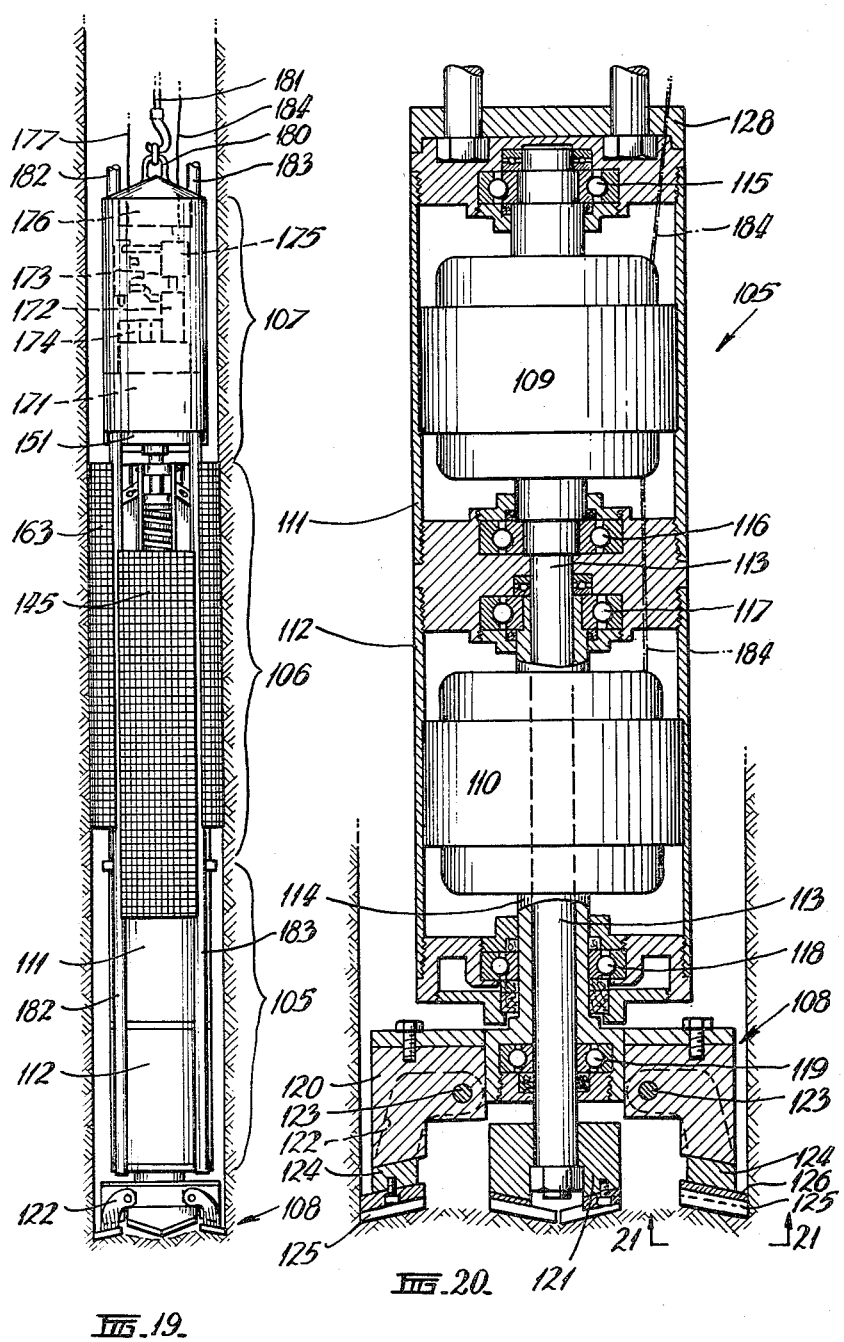

May 25, 1965 W. C. GINIES 3,185,225
FEEDING APPARATUS FOR DOWN HOLE DRILLING DEVICE
Filed May 2, 1963 14 Sheets-Sheet 10
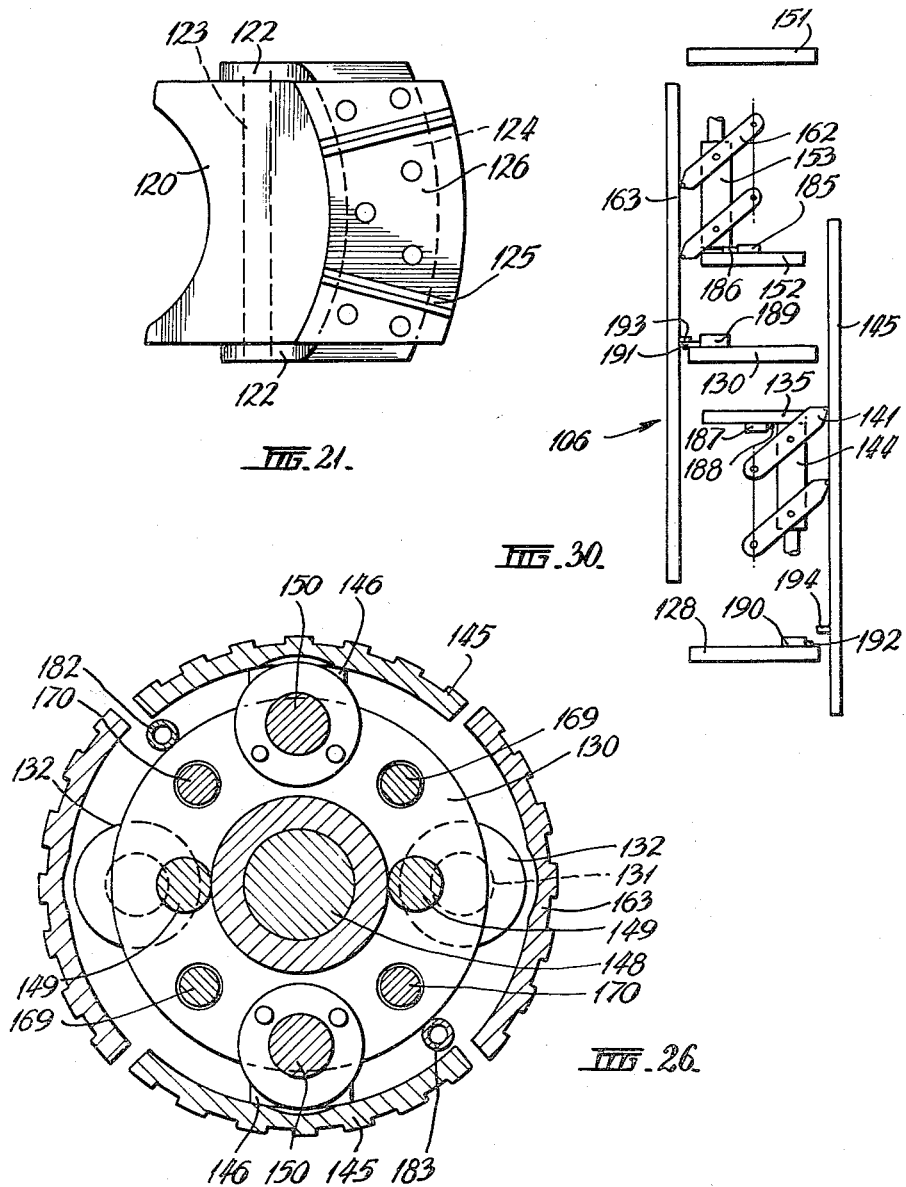

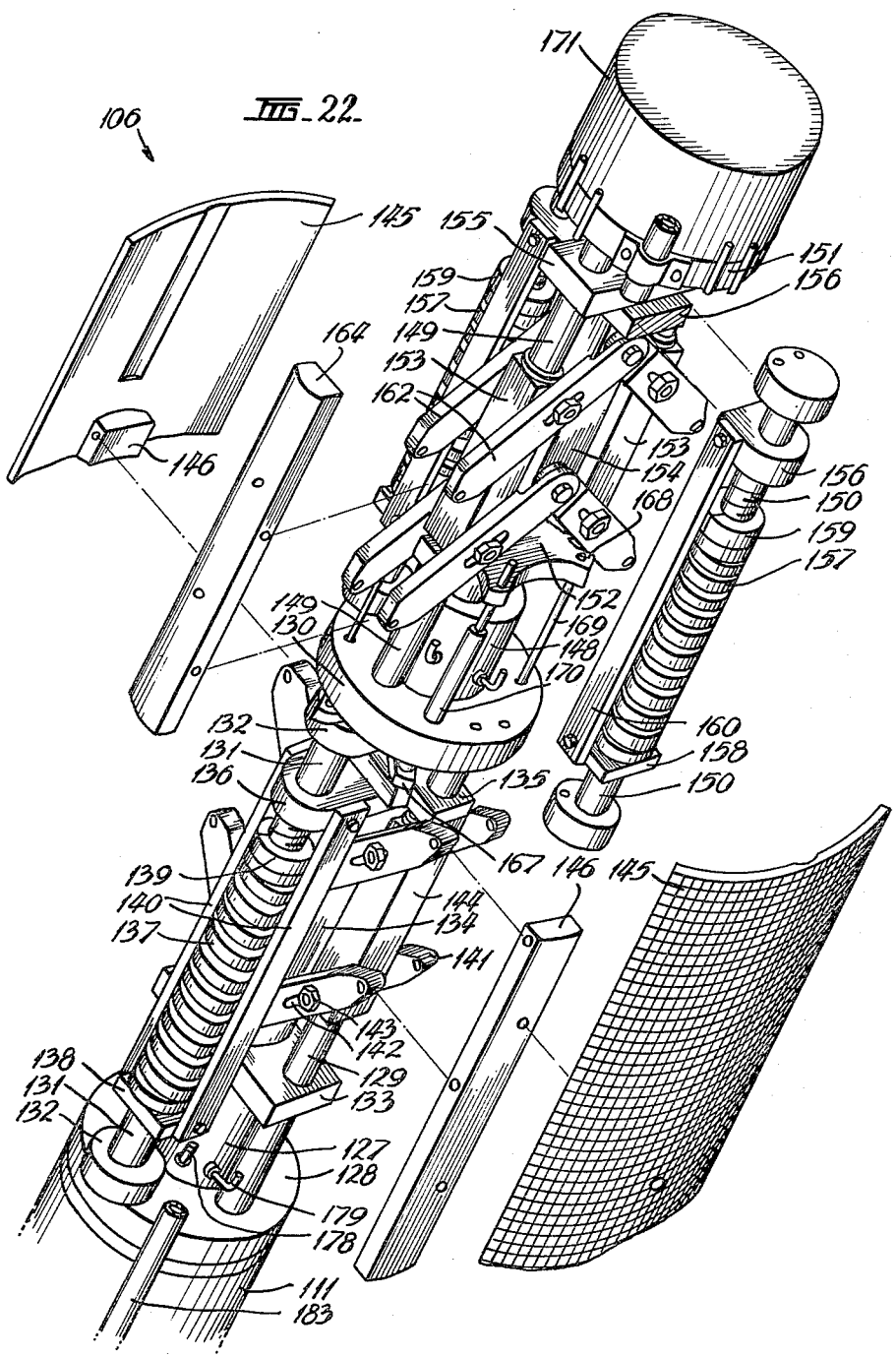

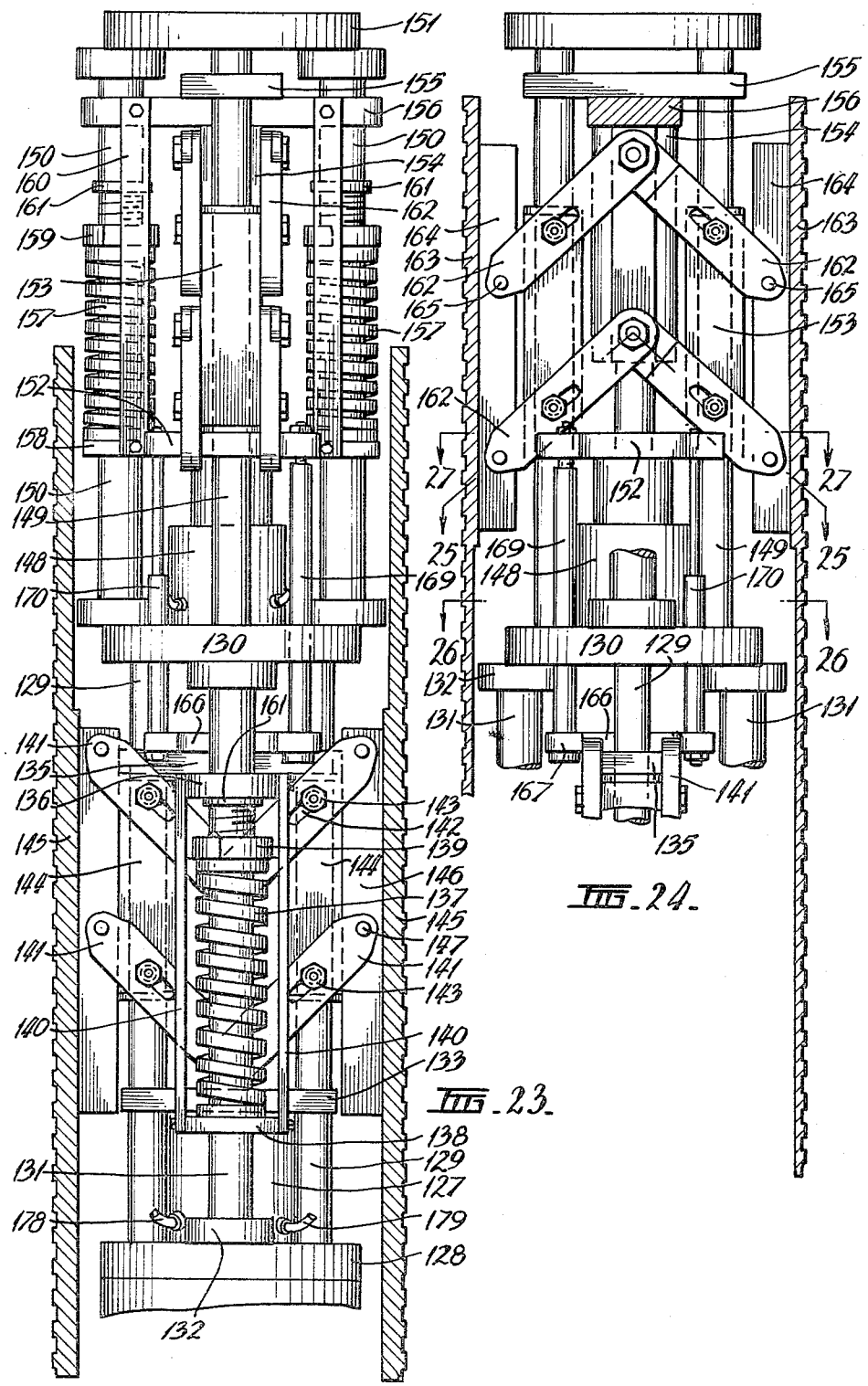

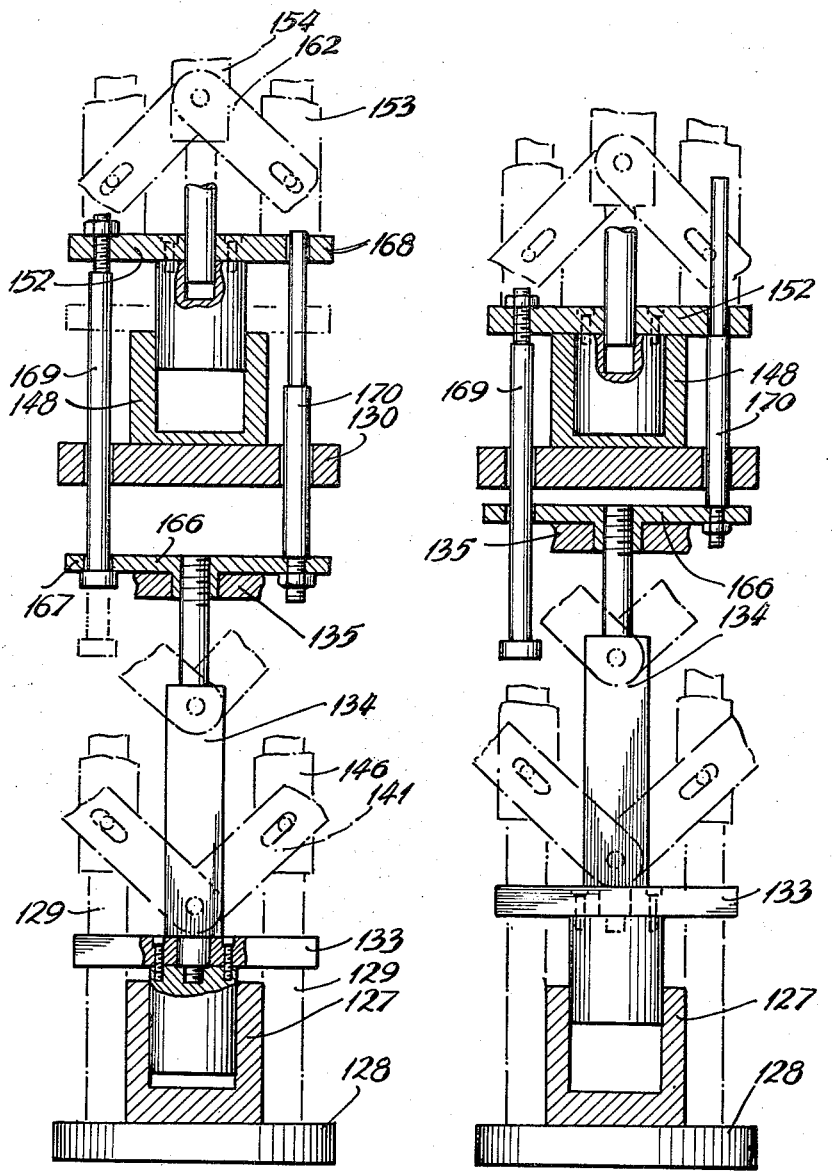

United States Patent Office 3,185,225
Patented May 25, 1965

3,185,225
FEEDING APPARATUS FOR DOWN HOLE DRILLING DEVICE
Wolstan Caruana Ginies, South Box Hill, Victoria, Australia, assignor to Wolstan C. Ginies Enterprises Proprietary Limited, Eltham, Victoria, Australia, a company of Victoria, Australia
Filed May 2, 1963, Ser. No. 277,654
Claims priority, application Australia, May 4, 1962, 17,294/62
29 Claims. (Cl. 175—94)

This invention relates to improvements in earth drilling machines and in particular refers to machines for drilling an extended bore in the strata.

Conventional deep hole drilling machines comprise rotary bits driven by shafting or the like from a surface rig. These rigs are expensive, difficult to transport to locations accessible only by air, and time consuming in their use.

It is an object of the present invention to provide a drilling machine capable of drilling an extended bore without the need for a large surface rig or installation.

It is also an object of the present invention to provide such a machine which is of compact self-contained form and is remotely controlled from the surface.

A futher object of the present invention is to provide a relatively inexpensive drilling machine which will automatically drill an extended bore and feed itself through the bore, either in the vertical or horizontal directions. By "vertical" is mean vertically downwards or "vertically" upwards, or at angles to the vertical.

A still further object of the present invention is to provide a machine which can be operated to drill bores or shafts of a substantial range of diameters.

According to one form of the invention there is provided a machine for drilling bores in the earth comprising a drill section and a feed and anchor section, said drill section including drive means connected to a drill bit assembly, and said feed and anchor section including at least two anchor assemblies sequentially operable to provide a continuous engagement of the feed and anchor section with the wall of a bore and means for feeding the drill section through the bore away from the engaged anchor assembly.

According to a further feature of the invention the anchor assemblies may be operable in their disengaged position to move stepwise in the bore behind the drill section. The anchor assembly operating means may conveniently include hydraulic motors or rams.

According to a still further feature of the invention, the drill bit assembly may comprise an outer bit mounting and an inner bit mounting adapted to be driven in contra-rotation. The inner and outer bit mountings are connected to concentric drive shafts driven through contra-rotational gearing or direct drive. The cutters on the drill bit mountings may be mounted in pairs so that as one cutter of a pair is cutting, the other cutter is being sharpened.

According to yet another feature of the invention means may be provided on the machine so as to provide a variation in the engaging movement of the anchor bar assemblies to tilt the machine in the bore.

Figure 2:
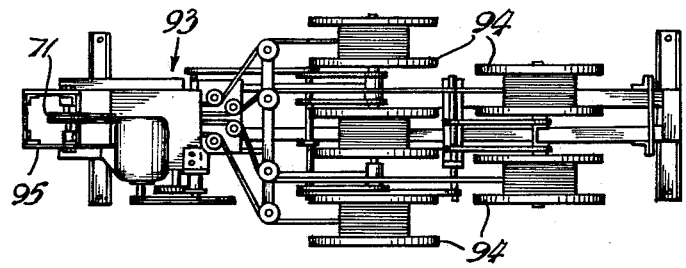
Figure 15:
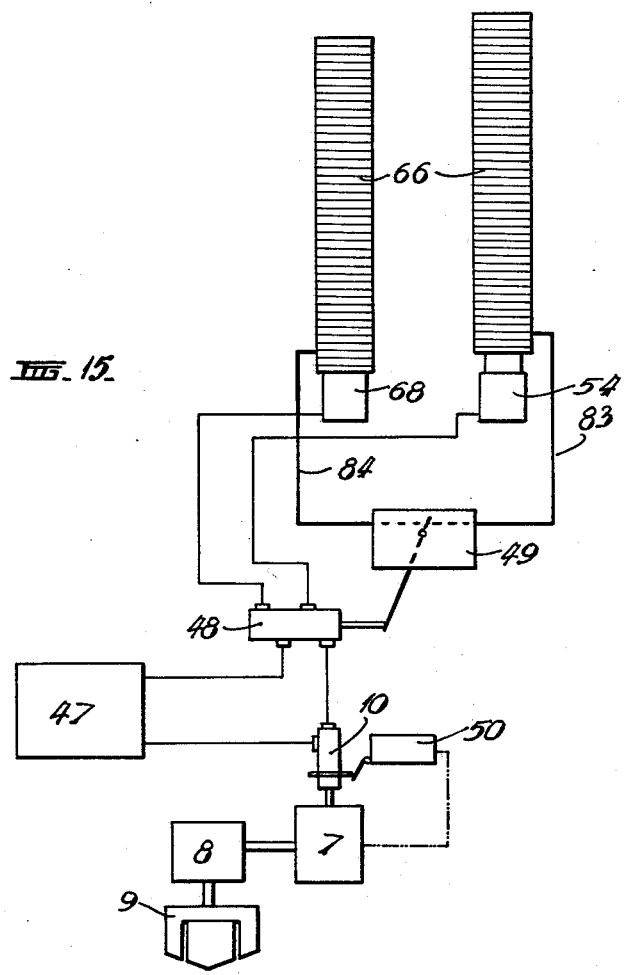
Figure 5:
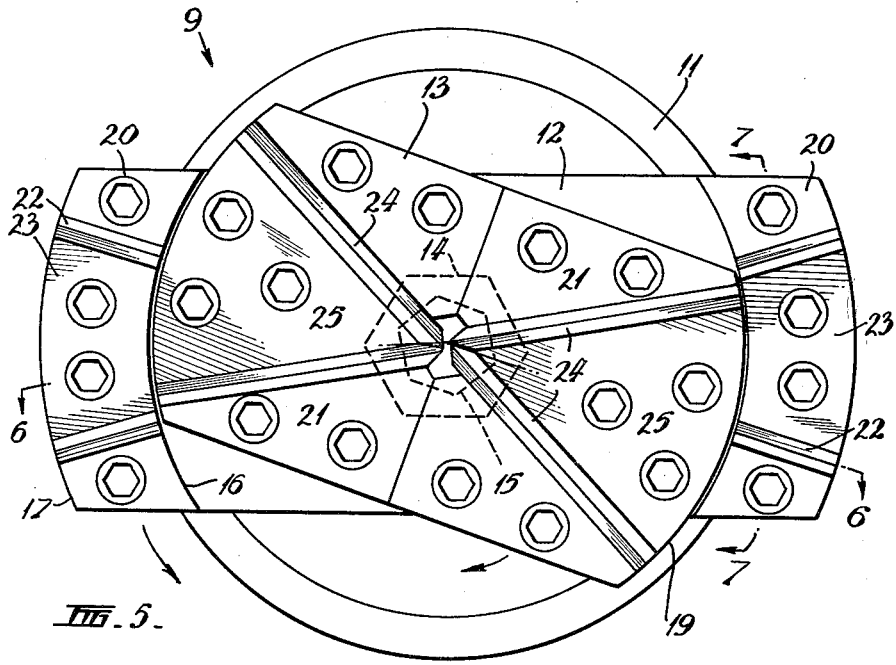
Figure 6:
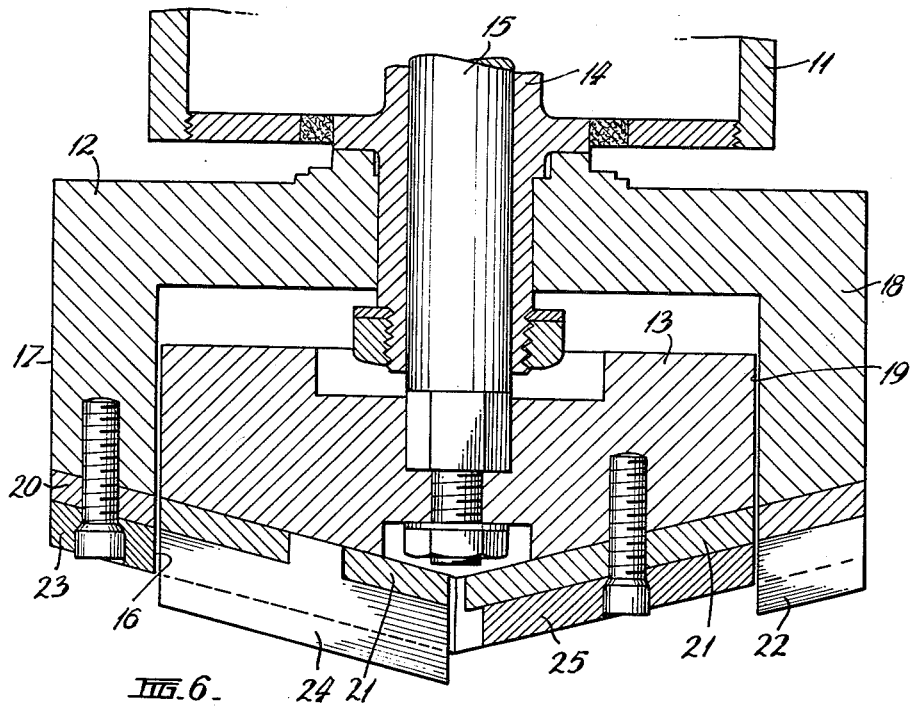
Figure 9:
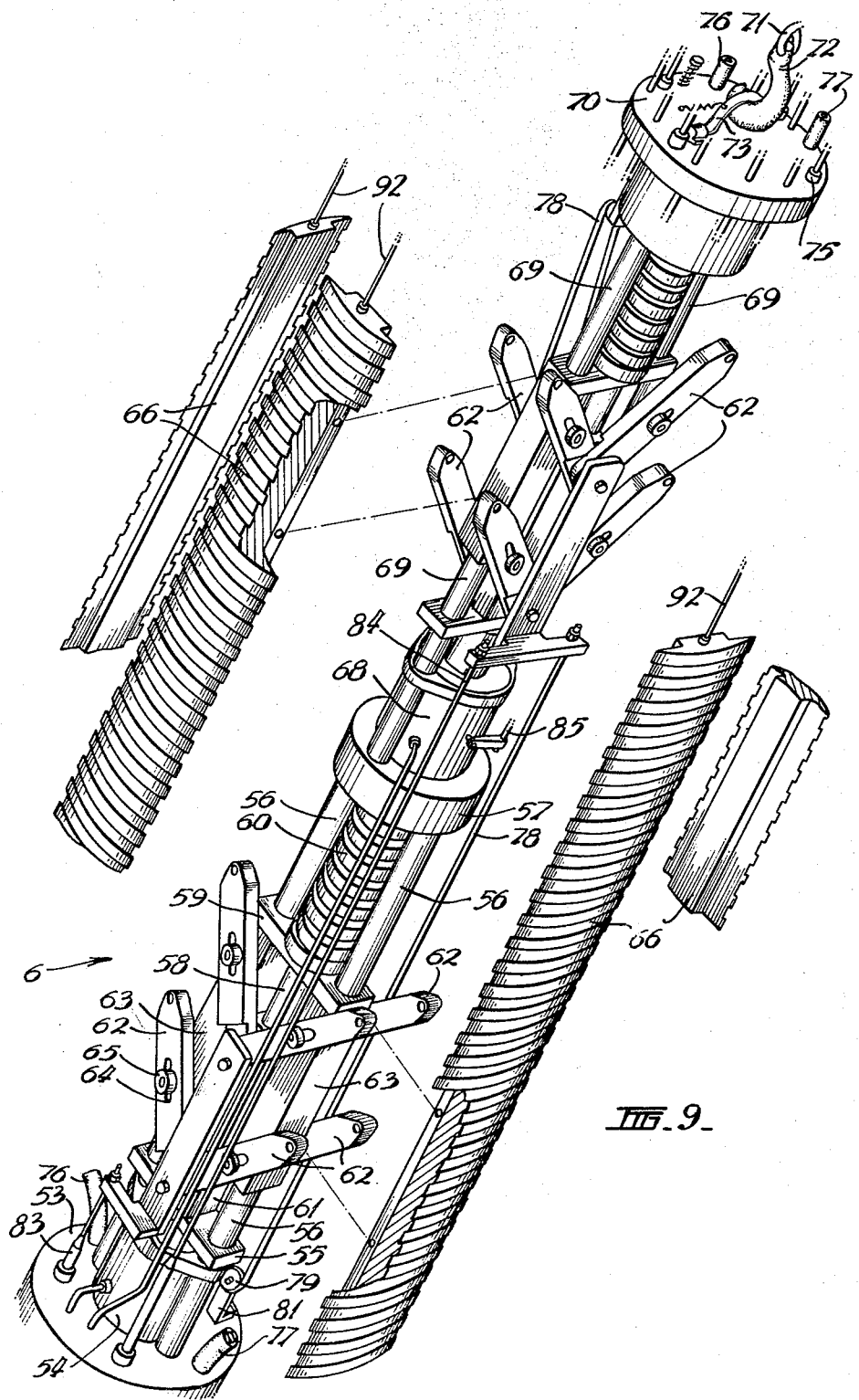
Figure 25:
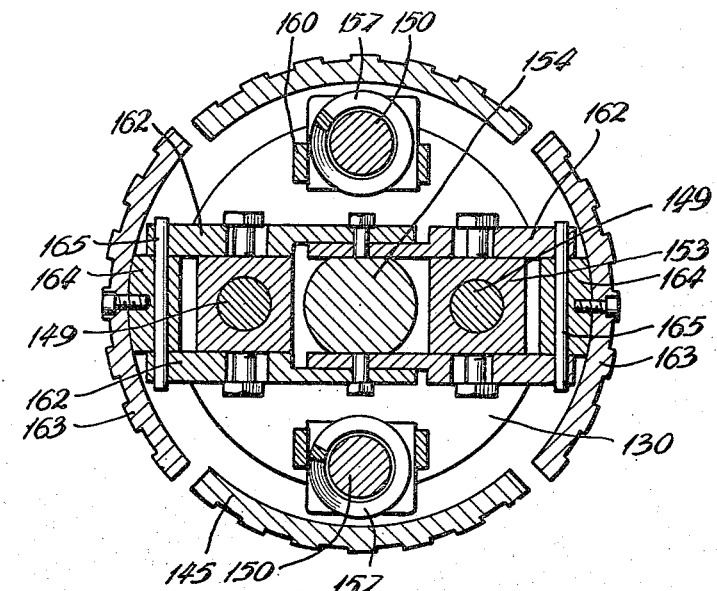
Figure 27:
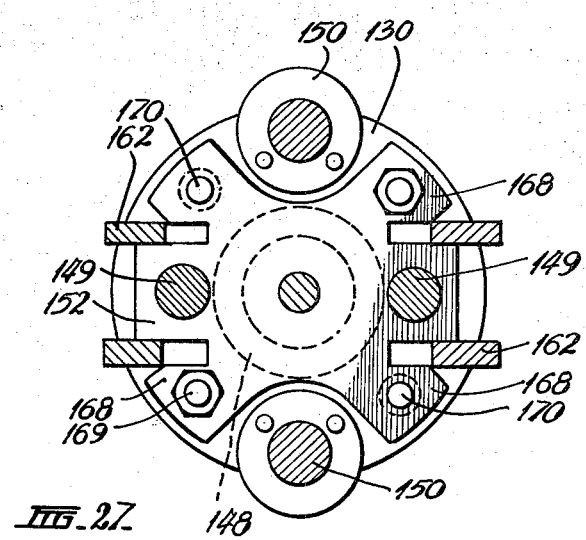

Further features and advantages of the invention will be apparent from the following description relating to the manner and performance of the invention as illustrated in the accompanying drawings in which:

FIGURE 1 is a general elevational view of one embodiment of the machine in a bore, FIGURE 2 is a plan view from the surface of the machine and winch mechanism of FIGURE 1, FIGURE 3 is a longitudinal sectional view through the drill section of the machine, FIGURE 4 is a longitudinal sectional view through the hydraulic pump and control mechanism compartment of the machine, FIGURE 5 is a plan view from below of the drill bit assembly, FIGURE 6 is a sectional view of the drill bit assembly along the line 6—6 of FIGURE 5, FIGURE 7 is a sectional view along line 7—7 of FIGURE 5 showing the mounting of the cutter bars on the outer bit mounting, FIGURE 8 is a sectional view along line 8—8 of FIGURE 3 showing a mounting arrangement in the gearing assembly, FIGURE 9 is a perspective view of the feed and anchor section of the machine, FIGURE 10 is a side view of the anchor assemblies in one position, FIGURE 11 is a semi-diagrammatic view of the anchor assemblies in similar position to FIGURE 10, showing the connection between the anchor assemblies, FIGURE 12 is a sectional view along line 12—12 of FIGURE 10 showing arrangement of link systems in the anchor assemblies, FIGURE 13 is a further sectional view through the anchor assemblies along the line 13—13 of FIGURE 10, FIGURE 14 is a side view similar to FIGURE 10 but showing the anchor assemblies in another position, FIGURE 15 is a schematic layout of the main parts of the machine, FIGURE 16 is a view showing the hoist cable connection at the top of the machine, FIGURE 17 is a view similar to FIGURE 16 but showing the hoist cable in its raising position, FIGURE 18 is a plan view along the line 18—18 of FIGURE 17 showing the location of control rods and cables through the hoist plate, FIGURE 19 is a side view of a modified form of the machine, FIGURE 20 is a longitudinal sectional view of the drill section of the modified machine, FIGURE 21 is a plan view along the line 21—21 of FIGURE 20 showing the pivotal cutter mounting of the outer bit mounting, FIGURE 22 is a part-exploded perspective view of the feed and anchor section of the modified machine, FIGURE 23 is a side view of the feed and anchor section with the anchor bars of the upper assembly removed, FIGURE 24 is a side view of the upper anchor assembly turned at 90° to FIGURE 23, FIGURE 25 is a sectional view along the line 25—25 of FIGURE 24 showing the mounting of the link system, FIGURE 26 is a sectional view along the line 26—26 of FIGURE 24 showing the arrangement and positions of the anchor bars, FIGURE 27 is a sectional view along the line 27—27 of FIGURE 24 showing the location of the connecting means between the rams of both assemblies, FIGURE 28 is a semi-diagrammatic sectional view along the line 28—28 of FIGURE 27 showing the connecting means between the rams of both assemblies, FIGURE 29 is a view similar to FIGURE 28 but showing the connecting means in another position, and FIGURE 30 is a diagrammatic sketch of the means for effecting tilting of the machine.

Referring to the embodiment illustrated in FIGURES 1 to 18, the drilling machine comprises two main sections, hereinafter referred to as drill section 5 and feed and anchor section 6, as indicated in FIGURE 1.

As shown in FIGURE 3, drill section 5 includes an electric motor 7 drivingly connected at one end through reduction gearing 8 to a contra-rotating drill bit assembly 9 and at the other end to a hydraulic pump 10.

Gearing 8 and motor 7 are housed in a fluid tight cylindrical casing 11 with drill bit assembly 9 extending from the lower end of the casing. Drill bit assembly 9 comprises an outer bit mounting 12 and an inner bit mounting 13 adapted to be driven in a contra-rotating manner by gearing 8 through concentric shafts 14 and 15 respectively.

As shown in FIGURES 5 and 6, outer drill bit mounting 12 is of substantial U-shape with arcuately shaped inner and outer surfaces 16 and 17, respectively, formed on legs 18, and inner drill bit mounting 13 is of substantial rectangular shape with arcuate surfaces 19. Arcuate surfaces 16, 17 and 19 follow arcs of circles having a common centre on the axis of shafts 14 and 15.

Outer bit mounting 12 is provided with cutter locating plates 20 secured thereto by screw members, and inner bit mounting 13 is provided with two cutter locating plates 21 secured thereto by screw members. Locating plates 20 and 21 have similar arcuate faces to those of their bit mountings 12 and 13 and coinciding therewith. Cutter bars 22 of outer bit mounting 12 are secured in pairs on locating plates 20 by wedge plates 23 so that bars 22 of each pair incline outwardly as shown in FIGURE 7, and extend radially as shown in FIGURE 5.

Cutter bars 24 of inner bit mounting 13 are also secured in pairs on locating plates 21 by wedge plates 25 so that bars 24 form two V's on the face of inner bit mounting 13 with the two bars of each V inclined outwardly from each other in similar fashion to the cutter bars 22 of outer bit mounting 12.

The cutter bars of each pair are inclined outwardly from each other so that as the mounting blocks are driven in one particular contra-rotational sense, one cutter bar of a pair will be cutting, the other bar of the pair being sharpened. By reversing the contra-rotational sense of direction at suitable intervals, full use of the cutter bars as they become sharpened may be achieved. It will be appreciated, however, that the cutting faces of the cutter bars may be so ground, that the bars so located in their mounting plates that contra-rotation in one sense will achieve a cutting action by all cutter bars.

In addition to the cutting action of the bits it will be appreciated that a crushing action between the contra-rotating bits is also achieved, ensuring that any large particles broken off at the drill face will be crushed between the inner and outer bit mountings.

The cutter bars may be straight or serrated, and they may extend at the same included angle or at different angles for each pair. Also, if desired the inner bit mounting may be fully circular and/or the outer bit mounting formed as a complete ring.

Instead of using the cutter bars illustrated, the end faces of the inner and outer bit mountings may be studded with drilling diamonds, and with the configuration of the bit mountings as illustrated an excellent washing effect is obtained on the diamonds to prevent them becoming clogged as is commonly experienced with conventional diamond bits.

Referring to FIGURE 3, gearing 8 providing the contra-rotational drive for drill bit assembly 9 includes a bevel gear 26 driven by motor 7 and meshing with pinions 27 and 27a one of which is fixed to shaft 28 the other being freely rotatable thereon. Pinion 29 secured to shaft 28 meshes with pinion 30 secured to shaft 31 to which is also secured pinion 32 engaging with gear wheel 33 rotatably mounted together with wheel 34 on shaft 35. Gear wheels 33 and 34 engage with similar wheels 36 and 37 respectively rotatably mounted on shaft 38 (see also FIGURE 8). A bevel pinion 39 secured on inner bit mounting shaft 15 is in engagement with an inner tooth ring on wheels 33 and 34 and a bevel pinion 40 secured on outer bit mounting shaft 14 is in engagement with an inner tooth ring on wheels 36 and 37. Suitable load and thrust bearings 41, 42 and 43 are provided in the gearing assembly.

At the other end of motor 7 as shown in FIGURE 4 a drive shaft 44 extends through a suitable bearing 45 and is provided with a swash plate 46 actuating a plunger of hydraulic pump 10. The motor 7 may be of the reversible type if change in the contra-rotational direction sense is required as discussed hereinbefore.

Hydraulic pump 10 pumps fluid from a reservoir tank 47 under pressure to a multi-way valve 48 controlled by a trip switch 49. The rate of feed of the pump 10 may be regulated through a solenoid or similar device 50 actuable in accordance with the load on electric motor 7 as will be hereinafter described.

The compartment housing the hydraulic pump 10, valve 48, trip switch 49, solenoid device 50 and reservoir tank 47 may be enclosed in an outer tube 51 overlapping casing 11 in a fluid tight manner. Plate 52 seals the motor and gearing compartment from the pump compartment and a blanking plate 53 is provided at the top of the pump compartment.

The feed and anchor section 6 (see FIGURES 1 and 9 to 14) operated by fluid pressure from pump 10 is secured to blanking plate 53 on outer tube 51.

As shown particularly in FIGURES 9, 10 and 14, section 6 includes a hydraulic ram 54 secured to blanking plate 53 and engageable with or attached to plate member 55 guidingly mounted on posts 56 secured between blanking plate 53 and support plate 57.

An axially located spindle 58 extends from plate member 55 through a further plate member 59 slidingly mounted on posts 56 and terminates below support plate 57. A compression spring 60 is located between member 59 and support plate 57. A sleeve member 61 is slidably mounted on spindle 58 between plate members 55 and 59 and two sets of parallel links 62 are pivotally attached to said sleeve so as to extend outwardly therefrom and pivoted part-way along their length on sleeves 63 slidably mounted on posts 56 through slots 64 and pins 65.

A pair of elongated anchor bars 66 having preferably grooved outer arcuate surfaces are pivotally attached to the outer ends of links 62 by means of pins 67.

A second hydraulic ram 68 is mounted on support plate 57 and supports and actuates a second link system and pair of anchor bars in similar fashion to that above described. This second link system and anchor bar assembly is oriented at 90° to the first assembly and guided on posts 69 secured between support plate 57 and hoist plate 70 so that the four anchor bars are equi-spaced around the periphery of the feed and anchor section 6.

The links 62 extend in V configuration as illustrated so as to provide the necessary radial outward and inward movement of the anchor bars, as will be hereinafter described, the ram 54 and its link and anchor bar assembly being referred to as the "lower anchor bar assembly" and the ram 68 and its link and anchor bar assembly being referred to as the "upper anchor bar assembly."

The hoisting cable 71 for the machine is provided with a hook 72 or other suitable attachment for engagement with a shackle 73 attached to hoist plate 70 in such a manner that slackening or removal of the tension in the hoist cable 71 will automatically free the hook 72 from the shackle 73. This may be effected by spring-loading the shackle to move away from the hook. Above the hook there is located a top hoist plate 74 attached to the hoist plate 70 by means of cables 75 which are loose when the hook and shackle are engaged but take up the load of the machine when the hook is disengaged from the shackle and engages under top hoist plate 74.

Clean water (includes drill mud) inlet pipes 76 and mud outlet pipes 77 and electric supply leads (not shown) extend from the machine to the surface of the bore. The clean water may be run to the machine under gravity or pumped in a vertical bore and pumped in a horizontal bore, and the mud pump may be suspended on the hoist cable with booster pumps located at intervals on the hoist cable if required. Alternatively the bore may be flooded and the mud pump located at the surface taking suction from adjacent the drill bit assembly under assistance from the head of water in the bore. In another alternative, of particular use when drilling horizontal bores, the clean water may be pumped to the drill face and the mud allowed to overflow at the surface or be pumped from the surface.

In yet another alternative, clean water inlet pipes and mud outlet pipes may be connected to the lower end of the machine adjacent the drill bit assembly. Seal members may be located around the periphery of the drill section so as to engage with the wall of the bore in a substantially sealing manner. Pressure applied to the clean water delivered to the drill bit assembly can therefore be utilised to force the mud from the drill face upwards through the mud pipes without the requirement of a mud extraction pump. Alternatively, with gravity feed clean water, an extraction pump can be utilised to remove the mud from the drill face but the suction need only be taken from the upper level of the head of clean water.

In operation of the machine the electric motor 7 drives the drill bit mountings 12 and 13 in contra-rotation and actuates the hydraulic pump 10 to deliver hydraulic fluid under pressure to multi-way valve 48 controlled by trip switch 49. When the valve 48 is open to one hydraulic ram to allow passage of fluid to actuate same, the other hydraulic ram is open to exhaust to reservoir 47 through valve 48.

The hydraulic rams are connected so that at no time will both rams be expanding, and at no time during operation of the machine will both anchor bar assemblies be out of engagement with the bore wall. This connection may be in the form of cables 78 connecting the slidable sleeve members 61 on spindles 58 extending above rams 54 and 68 through pulleys 79 and 80. Pulley 79 is attached to blanking plate 53 through bracket 81 and pulley 80 is attached to hoist plate 70 through a spring tensioned movable attachment 82 which allows pulley 80 to move away from hoist plate 70 when locking member 88 is released by tensioning cable 89 which is attached to top hoist plate 74 so as to slacken the cables when the drilling operation is to be commenced or terminated.

Referring to the lower anchor bar assembly (see FIGURES 10 and 14 in particular), pressure on ram 54 forces plate member 55 and sliding sleeve 61 upwards on spindle 58. Sleeves 63 on guide post 56 engage under plate member 59 which is held against spring 60 to limit its travel. Further movement of ram 54 and sleeve 61 will cause links 62 to pivot about sleeves 63 on guide posts 56 and move anchor bars 66 outwardly against the wall of the bore. When anchor bars 66 are firmly engaged with the wall of the bore, further extension of ram 54 will act to move the machine down relative to the anchor bars 66 engaged with the wall of the bore.

As ram 54 nears the limit of its predetermined extension, the spring attachment 82 on pulley 80 engaging cable 78 (see FIGURE 11) engages the pulley in its operative locked position with respect to hoist plate 70. When the limit of extension of ram 54 is reached, a cable or rod 83 (see FIGURES 4, 9, 10 and 14) secured between the ram and trip switch 49 actuates the trip switch which in turn operates the multi-way valve 48 to allow the pressure fluid from ram 54 to exhaust to reservoir 47. Spring 60 may now return to its normal extension forcing plate member 59, sleeves 61 and 63 and links 62, downwards. However before spring 60 can extend, the multi-way valve which has been actuated by trip switch 49 allows pressure fluid to pass to ram 68 of the upper anchor bar assembly which operates in the same manner as ram 54, and cables 78 connecting the sets of links 62 is of such length that spring 60 can only extend to move the sleeves and links of the lower anchor assembly when the upper anchor assembly bars 66 are engaged with the wall of the bore. This function can be more clearly appreciated from FIGURE 11. Alternatively the switch 49 and valve 48 may be connected to a timing device which functions to give the desired action of the links 62 and anchor bars 66. It can thus be seen by the above arrangement that at no time during the drilling operation of the machine will the anchor bars of both the upper and lower anchor assemblies be out of engagement with the wall of the bore.

Cable or rod 84 is also connected to trip switch 49 to actuate said switch when ram 68 of the upper anchor assembly has reached its limit of extension. The cycle of alternate engagement with the bore and feeding of the machine by each anchor assembly is repetitive during operation of the machine giving a substantially continuous drilling action.

The rate of feed of the machine through rams 54 and 68 may be regulated in accordance with the hardness or resistance of the earth to drilling, by controlling the flow of pressure fluid to the rams through solenoid 50 connected to a metering valve in pump 10. Solenoid 50 is connected in the electrical circuit to the motor 7, so as to operate in accordance with the load on motor 7 during drilling.

During drilling clean water is run or pumped to the machine or bore, and mud is pumped or run out of the bore as has been previously described. The water and mud circulating around the machine assists in cooling the drill section 5 of the machine.

When drilling operations are stopped and it is desired to bring the machine to the surface, the tension on hoist cable 71 is relieved allowing hook 72 and shackle 73 to disengage. The hook is then drawn up under top hoist plate 74 as shown in FIGURE 17 to take the weight of the machines through cables 75.

Cable 89 attached between top hoist plate 74 and locking member 88 is first tensioned as the top hoist plate is lifted by hook 72, to release pulley 80 and slacken cables 78 between the sliding sleeves 61 of the anchor assemblies. Cables 85 and 86 are also attached to plate 74, cable 85 being connected to relief valve 87 on ram 68 and cable 86 being connected to a similar relief valve (not shown) on ram 54 (see FIGURE 9), so that when these cables are tensioned on lifting of top hoist plate 74 the relief values are operated to bleed hydraulic fluid from the rams. Cables 90 and 91 are also connected between the sliding sleeves 61 of both anchor bar assemblies and the top hoist plate 74 and on tensioning, act to pull sleeves 61 downwards to assist springs 60 in bringing the anchor bars 66 of both assemblies clear of the wall of the bore. Cables 92 may be attached between the top of the anchor bars 66 and the top hoist plate 74 to assist in pulling the anchor bars off the bore wall and preventing them, through their weight, tending to expand links 62.

With both anchor bar assemblies clear of the bore wall, the machine may then be hoisted to the surface. In FIGURES 1 and 2 there is illustrated a winch mechanism 93 for hoisting and lowering the drilling machine and includes drums 94 for storage of hoist cable 71, water pipes and electric leads. A guide frame 95 is provided to locate and guide the machine until the anchor bars 66 are engaged in the bore. Guide frame 95 is pivotally mounted on the frame of winch mechanism 93 to allow ease of access to the machine in a horizontal position.

Referring now to FIGURES 19 to 30 which illustrate a modified form of the machine, the feed and anchor section 106 is located between the drill section 105 and the pump and control mechanism section 107, with drill bit assembly 108 extending from the lower end of drill section 105 (see FIGURE 19).

As shown in FIGURE 20, drill section 105 includes two electric motors 109 and 110 housed in a casing formed by tubular members 111 and 112 in a fluid-tight manner. Motor 109 drives shaft 113 in one direction and motor 110 drives shaft 114 in the opposite direction. Shaft 113 extends through motor 110 and through shaft 114, with both shafts being supported for rotation and against thrust by bearings 115, 116, 117, 118 and 119.

Drill bit assembly 108 is in general configuration similar to drill bit assembly 9 of the previous embodiment, and includes an outer bit mounting 120 and an inner bit mounting 121 secured to shafts 114 and 113 respectively for direct drive.

Inner bit mounting 121 is similar to inner bit mounting 13 of the previous embodiment and will not be described in detail. Outer bit mounting 120 (see FIGURES 20 and 21) is provided with substantially U-shaped or saddle-type cutter mounting brackets 122 pivotally mounted at 123 to mounting 120. Base parts 124 of brackets 122 provide mounting blocks for cutter bars 125 which are secured thereto in similar manner as in the previous embodiment by wedge plates 126. Base parts 124 and their abutting faces on mounting 120 are shaped so that cutter bars 125 are inclined downwardly and outwardly of their mounting so that pressure on the brackets 122 during drilling operations will move the brackets outwardly until base parts 124 abut against mounting block 120. When the machine is to be removed from the bore, brackets 122 will pivot inwardly to ensure that the cutter bars 125 are held clear of the wall of the bore.

Feed and anchor section 106 operates on generally the same principle as feed and anchor section 6 of the previous embodiment but is of modified construction.

As shown particularly in FIGURES 22, 23 and 24 hydraulic ram 127 of the lower anchor bar assembly is mounted on support member 128 secured to the upper end of the motor casing. Guide posts 129 are secured between member 128 and intermediate support member 130, and spacer rods 131 are also secured between members 128 and 130 and held by adjusting collars 132.

Plate member 133 is attached to ram 127 for movement therewith and is slidably guided on guide posts 129 and has secured thereto an axially located member 134 slidably engageable at its upper end in a further bar member 135 which is slidably mounted on posts 129. Bar member 136 slidably mounted on spacer rods 131 is secured to bar member 135. Springs 137 are located on spacer rods 131 between sliding plates 138 and adjusting collars 139 and act to pull bar members 136 and 135 downwards through straps 140 secured between sliding plates 138 and bar member 136.

Pairs of parallel links 141 similar to links 62 of the previous embodiment are pivotally attached at their inner ends to member 134 and pivotally attached through slots 142 and pins 143 intermediate their ends on sliding blocks 144 mounted on guide posts 129. Anchor bars 145 are attached to the outer ends of links 141 through pins 147 passing through pads 146 secured to the inner surfaces of bars 145.

The upper anchor bar assembly includes a hydraulic ram 148 mounted on intermediate support 130, and guide posts 149 and spacer rods 150, as in the lower anchor bar assembly are secured between intermediate support member 130 and upper support member 151. Guide posts 149 and spacer rods 150 are oriented at 90° to posts 129 and rods 131 of the lower assembly. Plate member 152 is attached to ram 148 and is slidably guided on posts 149 to abut against sliding blocks 153 on posts 149. Axially located member 154 is attached to plate members 155 and 156 at the upper end of the machine, member 155 being slidably mounted on posts 149 and member 156 being similarly mounted on spacer rods 150, and both members 155 and 156 being securely attached to each other. The lower end of axial member 154 is slidable through member 152 into a recess in ram 148. Links 162 are pivotally located on axial member 154 and sliding blocks 153 as in the lower assembly and are attached at their outer ends to anchor bars 163 through pads 164 and pins 165.

Springs 157 are located on spacer rods 150, as in the lower assembly, between sliding plates 158 and adjusting collars 159, with straps 160 fastened between sliding plates 158 and plate member 156. Spacer rods 131 and 150 are provided with fixed collars 161 against which plate members 136 and plate member 156 abut to allow pre-loading of the springs 137 and 157 to ensure that links 141 and 162 will move instantly to expand their anchor bars on initial movement of rams 127 and 148.

A plate member 166 is secured at the top of axially located member 134 and is provided with four lugs 167. Plate member 152 in the upper assembly is also provided with four similar lugs 168. Between the lugs at diametrically opposed positions there are located two bolt members 169 and at the other diametrically opposed positions there are located two pusher rods 170. Bolts 169 are fastened to lugs 168 and are slidable through members 166 and 130 with heads located below lugs 167 and engageable therewith. Pusher rods 170 are fastened to lugs 167 of member 166 and have a reduced diameter portion forming a shoulder engageable with the underside of lugs 168.

As illustrated in FIGURES 28 and 29, bolts 169 act to left ram 127 of the lower assembly when ram 148 of the upper assembly is nearing the limit of its extension. Pusher rods 170 act to left ram 148 when ram 127 is nearing the limit of its extension. This, as will be more fully described hereinafter with reference to the operation of the machine, ensures that as the feeding stroke of one anchor assembly is completed, the anchor bars of the other assembly are in engagement with the wall of the bore. Pusher rods 170 may be secured to lugs 168 and engage against lugs 167 if desired. The pump and control mechanism section 107 (see FIGURE 19) secured to upper support plate 151 is similar in layout to that in the previous embodiment with the exception that an electric motor 171 is provided for actuating hydraulic pump 172. Multi-way valve 173, fluid metering solenoid 174, trip switch 175 and reservoir 176 are as in the previous embodiment. The multi-way valve is constructed so as to be actuated by remote control cable 177 to bleed both rams through pressure connections 178 or through auxiliary connections 179 when it is desired to retract both anchor assemblies to lower or lift the machine in the bore. The top of the machine is of conical configuration with a hoist cable connection 180 and hoist cable 181. Water and mud pipes 182 and 183 may be provided as required. Electric leads 184 extend from the top of the machine to the surface.

Rods or cables (not shown) are connected between the plate member 133 on ram 127 and the trip switch 175 and between plate member 152 on ram 148 and the trip switch, as in the previous embodiment, to switch over pressure fluid from one ram to the other.

In operation of the machine of this embodiment, motors 109 and 110 drive drill bit assembly 108 in contra-rotation and motor 171 drives hydraulic pump 172 to supply fluid from reservoir 176 under pressure to ram 127 or ram 148 through multi-way valve 173.

Referring to the lower anchor and feed assembly, pressure to ram 127 lifts plate member 133 which in turn lifts axial member 134 to pivot links 141 outwardly against the pressure of springs 137 acting downwardly through plate members 135 and 136 on sliding sleeves 144. When anchor bars 145 on links 141 are in firm engagement with the wall of the bore, further movement of the ram 127 will move the machine down relative to the lower anchor bar assembly held in engagement with the wall of the bore.

As ram 127 nears the end of its extension, pusher rods 170 engage under lugs 168 of member 152 and begin to lift ram 148 which draws fluid from the reservoir 176. The links of the upper assembly begin to pivot outwardly and as ram 127 completes its extension, the anchor bars of the upper assembly are in engagement with the wall of the bore and pressure fluid is connected to ram 148 as trip switch 175 is actuated and the upper anchor and feed assembly feeds the machine downwards in the same manner as the lower assembly. The mode of action of the upper assembly, by reason of the inversion of the link members to save space in the machine differs in that ram 148 acts through plate member 152 on sliding blocks 153 and springs 157 act through plate 156 on axial member 154 to provide the required outward pivoting of links 162. As ram 148 nears the end of its extension, bolts 169 engage under lugs 167 of member 166 and lift ram 127 in the same manner and for the same purpose as pusher rods 170 acting on lugs 168 of member 152.

By pre-loading the springs of the assemblies in the retracted positions of the rams, positive and instant movement of the links in their outward pivotal movement is achieved when the inactive ram is extended by pusher rods 170 or bolts 169.

In FIGURE 30 there is diagramatically illustrated means for tilting the machine off-course in the bore in any desired direction.

Solenoid devices 185 (only one shown) are located on member 152, each device 185 being adapted to move a slipper or distance piece 186 under the sliding blocks 153, and solenoid devices 187 (only one shown) are located on member 135, each device 187 being adapted to move a slipper or distance piece 188 above the sliding blocks 144. When ram 148 is being extended and a slipper 186 is engaged an anchor bar 163 will engage the wall of the bore before the anchor bar 163 on the opposite side, and tilt the machine off the vertical. Similarly when ram 127 is being extended and a slipper 188 is engaged, an anchor bar 145 will engage the wall of the bore before the anchor bar 163 on the opposite side, and tilting of the machine will be effected.

As springs 137 and 157 are pre-loaded in the retracted positions of the anchor bars, sliding sleeves 153 and 144 have to be moved away from members 152 and 135 respectively to allow insertion of the slippers. This may be achieved by providing further solenoid devices 189, 190 and slippers 191, 192 on support members 130 and 128 respectively. Lugs 193 and 194 are provided on anchor bars 163 and 145 respectively so that when slippers 191 and 192 are extended, the anchor bars will rest thereon and allow sliding blocks 153 and 144 to move away from members 152 and 135 respectively. When slippers 186 or 188 are engaged, slippers 191 or 192 may be retracted. It will be appreciated that a similar type of tilting system may be incorporated in the previously described embodiment.

It will also be appreciated the drill bit assembly 108 and the direct drive motors may be incorporated in the previously described embodiment.

What I claim is:

1. A machine for drilling bores in the earth comprising a drill section and a feed and anchor section, said drill section including a drill bit assembly and drive means connected to said drill bit assembly, said feed and anchor section including two anchor assemblies sequentially operable to provide a continuous engagement of the feed and anchor section with the wall of a bore, actuating means connecting the two anchor assemblies in the feed and anchor section for operating the anchor assemblies for engagement and disengagement with the bore wall, said actuating means being operable to feed the drill section through the bore away from the engaged anchor assembly, said anchor assemblies being operable in their disengaged position to move stepwise in the bore behind the drill section, said anchor assemblies each including a pair of diametrically opposed elongated bar members having arcuate outer surfaces provided with means for gripping the bore wall, said actuating means including hydraulic means for actuating said bar members, one of said anchor assemblies being oriented at 90° with respect to the other of said assemblies with the bars of an assembly being movable between and in close proximity to the bars of another assembly.

2. A machine according to claim 1 wherein the anchor assemblies are actuated by the drill section feeding means.

3. A machine according to claim 2 wherein the drill section feeding means comprise hydraulic rams operable through the initial part of their stroke to engage their respective anchor assemblies against the bore wall and thereafter move the drill section away from the stationary engaged anchor assembly.

4. A machine according to claim 3 including a compartment housing an electrically driven hydraulic pump for supplying pressure fluid to one or the other of the anchor assembly and feeding rams through a control valve, said control valve being operable by means connected to the rams so that as one ram reaches the end of its operating stroke the valve is actuated to exhaust said one ram and supply pressure fluid to the other ram.

5. A machine according to claim 4 wherein said control valve operating means include rods or cables connected between the rams and operating means on the control valve.

6. A machine according to claim 5 wherein said actuating means comprises a trip-switch operable to move the control valve from one position to another.

7. A machine according to claim 3 wherein the anchor bars are mounted on pivotal parallel link systems engageable by the rams against spring means to move the anchor bars outwardly of the machine, and engageable by the spring means on release of pressure fluid in the rams to move the anchor bars inwardly.

8. A machine according to claim 7 wherein means are provided connecting the link systems of each anchor assembly, said connecting means acting to prevent inward movement of the anchor bars of one assembly under spring pressure until the anchor bars of the other assembly are in their outward engaged position in the bore.

9. A machine according to claim 7 wherein means are provided connecting the rams of both anchor assemblies and act to extend the inoperative ram, with consequential outward movement of its anchor bars into engagement with the wall of the bore, as the operative ram reaches the limit of its outward travel.

10. A machine according to claim 9 wherein the spring means are pre-loaded on the link systems to ensure positive and instant outward movement of the anchor bars of the inoperative ram.

11. A machine according to claim 1 wherein the drill bit assembly comprises an outer bit mounting and an inner bit mounting adapted to be driven in contra-rotation.

12. A machine according to claim 11 wherein the drill bit mountings are connected to concentric shafts driven by an electric motor through contra-rotational gearing.

13. A machine according to claim 11 wherein the drill bit mountings are connected to concentric shafts each directly coupled to an electric motor.

14. A machine according to claim 12 wherein said electric motors are reversible.

15. A machine according to claim 11 wherein the outer drill bit mounting is of substantially U-shaped configuration with a base part connected to the outer drive shaft and two leg parts extending forwardly of the machine, the outer and inner surfaces of the leg parts being arcuately shaped and the inner drill bit mounting is of substantially rectangular configuration with arcuate surfaces formed on the two shorter opposed sides which rotate in close proximity to the inner surfaces of the outer bit mounting leg parts.

16. A machine according to claim 15 wherein said arcuate surfaces all follow arcs of circles having a common centre on the axis of the drive shafts.

17. A machine according to claim 15 wherein cutter bars are located at the end faces of the outer bit mounting legs and on the end face of the inner bit mounting, said cutter bars being located in pairs so as to incline outwardly from each other and extend substantially radially across said end faces.

18. A machine according to claim 17 wherein the cutter bars of the inner bit mounting form two V-shapes extending radially from the centre of the inner bit mounting end face.

19. A machine according to claim 17 wherein the outward inclination of the cutters in each pair is such that when the drill bit mountings are driven in one particular contra-rotational sense, one cutter bar of a pair will be cutting, the other bar of the pair being sharpened.

20. A machine according to claim 17 wherein the cutter bars of the outer bit mounting are secured to saddle-type brackets pivotally mounted on said outer bit mounting, said brackets being adapted to abut against the end faces of the outer bit mounting legs under drilling pressure and pivot inwardly towards each other clear of the wall of the bore when the machine is being raised or lowered in the bore.

21. A machine according to claim 15 wherein the contra-rotating bits also provide a crushing action at their side faces.

22. A machine according to claim 7 wherein means for releasing said connecting means and means for bleeding fluid from the rams are provided so as to be actuable to allow both anchor bar assemblies to move inwardly when it is desired to raise or lower the machine in a bore.

23. A machine according to claim 22 wherein said releasing and bleeding means are operable through a hoist cable or remotely from the surface.

24. A machine according to claim 9 wherein means are provided for bleeding fluid from the rams to allow both anchor bar assemblies to move inwardly when it is desired to raise or lower the machine in a bore.

25. A machine according to claim 24 wherein said bleeding means are operable from the surface.

26. A machine according to claim 4 wherein electric means are provided for regulating the output of the hydraulic pump and consequentially the rate of feed for the machine, in accordance with the load on the drill section drive means.

27. A machine according to claim 7 wherein means are provided so as to be engageable with selected anchor bar link systems to provide a variation in the outward movement of the anchor bars of the selected assembly and tilt the machine in the bore.

28. A machine according to claim 27 wherein said means include distance pieces insertable in said link system by solenoids or like actuating devices.

29. A machine according to claim 1 wherein water and/or mud pipes are provided extending from the machine to the surface.

References Cited by the Examiner
UNITED STATES PATENTS

| | | | |
|---|---|---|---|
| 556,718 | 3/96 | Semmer | 175—99 |
| 2,518,330 | 8/50 | Jasper et al. | 254—134.5 |
| 2,919,121 | 12/59 | Ruth | 175—76 |
| 2,946,578 | 7/60 | De Smaele | 175—76 |

BENJAMIN HERSH, *Primary Examiner.*